May 11, 1943.                O. MOORE                2,318,956
POWER TOOL MACHINE
Filed Aug. 2, 1940                2 Sheets-Sheet 1
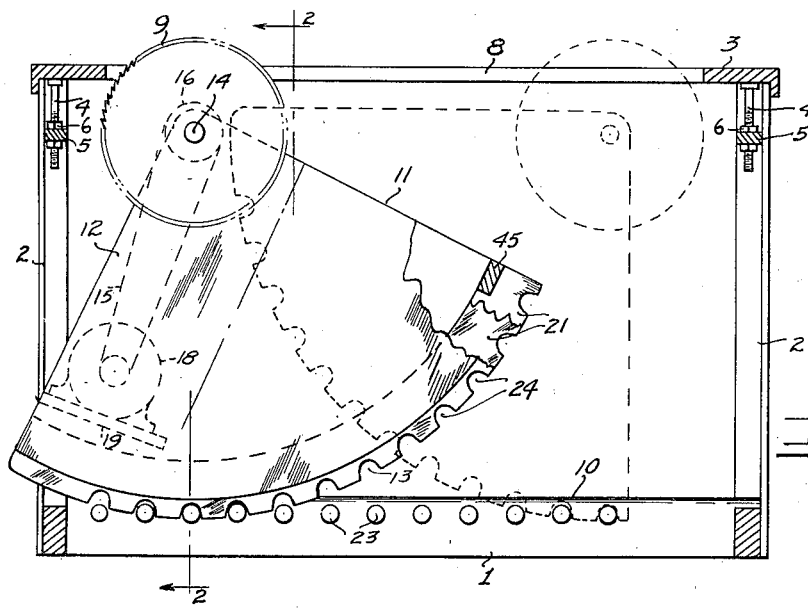
Fig. 1
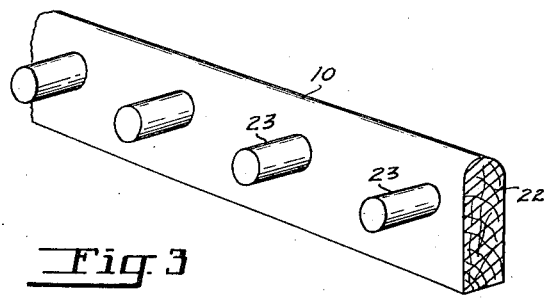
Fig. 3
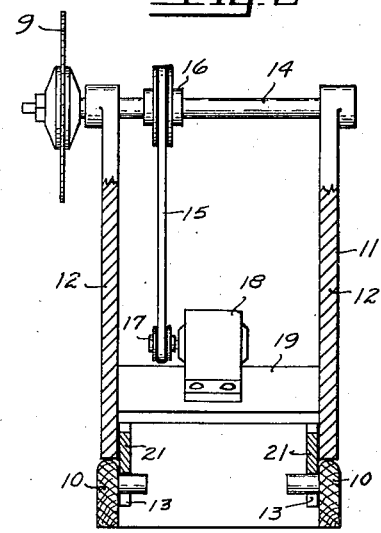
Fig. 2
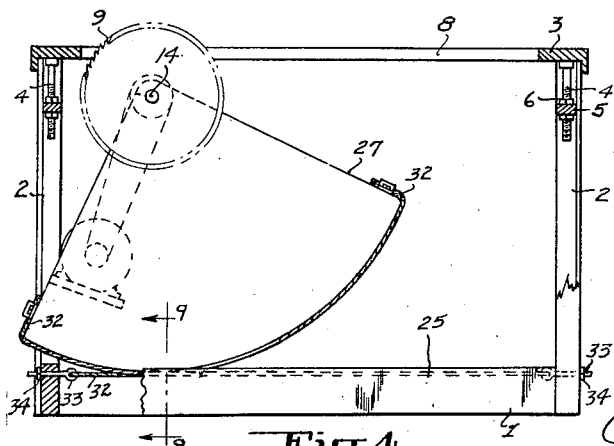
Fig. 4
INVENTOR
OMER MOORE
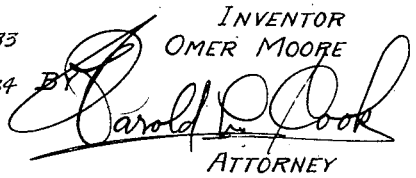
ATTORNEY May 11, 1943.  O. MOORE  2,318,956
POWER TOOL MACHINE
Filed Aug. 2, 1940  2 Sheets-Sheet 2

INVENTOR
OMER MOORE
ATTORNEY

UNITED STATES PATENT OFFICE 2,318,956

POWER TOOL MACHINE

Omer Moore, Corvallis, Oreg.

Application August 2, 1940, Serial No. 349,827

5 Claims. (Cl. 143—47)

This invention relates to a machine for producing straight line movement of a power driven tool, and has particular reference to a machine in which a rotary tool such as a circular saw, sanding disc, emery wheel, or the like, is mounted for reciprocatory motion in a horizontal straight line, the movement of the tool carrying frame being manually controlled by means of mechanism which the operator may actuate with his foot.

The illustrated embodiment of the invention relates to a machine for imparting straight line movement to a cut-off or trim saw, such a machine being adapted, however, for various uses. For example, because the machine is so designed that the saw travels in a horizontal straight line and will cut at a predetermined elevation throughtout the full length of its stroke, it may be used for grooving or dadoing relatively wide or long pieces, such as table tops, moldings, and the like. Moreover, because the saw travels in a straight line, instead of swinging through an arc, cut-off saws of much smaller diameter may be used in place of the larger diameter saws usually mounted on a swinging frame for doing the same work. For example, a saw 36 inches in diameter mounted on a machine embodying the present invention will cut through a timber 12 inches in thickness and of indefinite width, and permit the use of an eight inch collar on the saw arbor, whereas a saw of 50 inches in diameter is required for the same purpose if mounted on a swinging frame which moves in an arc about a pivotal support.

The straight line travel of the saw, or other rotary tool, is accomplished by foot control, the hands being free to place and hold the stock; whereas, in straight line sawing machines heretofore in use, movement of the saw is hand-controlled, it being necessary either to pull the saw by hand or to move it by operation of a hand crank.

Essentially, the tool carrying frame is provided at the base with arcuate rocker surfaces, with the arbor mounted coaxially with the arc of the rocker surfaces. By reason of this construction, when the frame is rocked on the arcuate bearing surfaces the arbor advances in a straight line. Either manual or mechanical devices may be incorporated in the mechanism for rocking the frame, as well as mechanism for controlling the length of travel of the tool. The invention is especially suited, however, for use in small shops, and the frame is preferably designed to be rocked manually by the operator by means of mechanism which he may actuate with his foot.

Power to drive the tool may be furnished by an electric motor so mounted on the frame as to serve as a weight to rock the frame back at the conclusion of each cutting stroke, although power may be transmitted to the arbor from another source, and any one of several means may be adopted to restore the frame to its normal rest position each time after it completes a certain operation.

It is, therefore, an object of the invention to provide a mechanism for mounting and operating a rotary tool and rendering it responsive to the will of the operator, whereby the capacity of the machine is greatly increased and the ease of operation considerably augmented.

It is a further object of the invention to provide a swing-type frame for a rotary tool so designed that the tool travels in a horizontal straight line throughout the full length of its stroke.

A further object of the invention is to provide a swing-type traveling saw which may be used for dadoing or grooving relatively wide or long pieces.

It is a further object of the invention to provide a sawing machine in which the saw carrying frame is designed to be rocked manually by the operator by means of foot actuated mechanism, leaving the hands free to manipulate the stock.

It is a further object of the invention to provide a saw frame for a traveling saw, having arcuate bearing surfaces, with the saw arbor mounted on the axis of the arc, whereby, by rocking the frame, the saw is caused to travel in a straight line; together with means for holding the frame within predetermined bounds.

Other objects of the invention are to provide a machine of few parts, which may easily be assembled or dismantled, and transported to new fields of operation; and which provides the widest possible margin of safety and convenience in operation.

Additional objects and advantages of the invention will become apparent as the description proceeds in connection with the accompanying drawings, it being understood that the drawings are illustrative only, and that various changes and modifications of the device may be resorted to without departing from the spirit or scope of the invention; and I deem myself entitled to all such changes and modifications thereof as fall within the scope of the claims hereunto appended.

In the drawings:

Figure 1 is a side elevation, partly in section, of an embodiment of the invention, showing, in full lines, the position of the machine at rest, and, in dotted lines, the position of the various parts of the machine at the moment when a full stroke of the tool carrying frame is accomplished.

Figure 2 is a sectional elevation taken transversely of the machine on the line 2—2 of Figure 1.

Figure 3 is a perspective view of a portion of the track for the tool carrying frame.

Figure 4 is a side elevation of a cut-off saw employing the present invention, illustrating a modification of the mechanism for holding the saw carrying frame within predetermined bounds.

Figure 5:
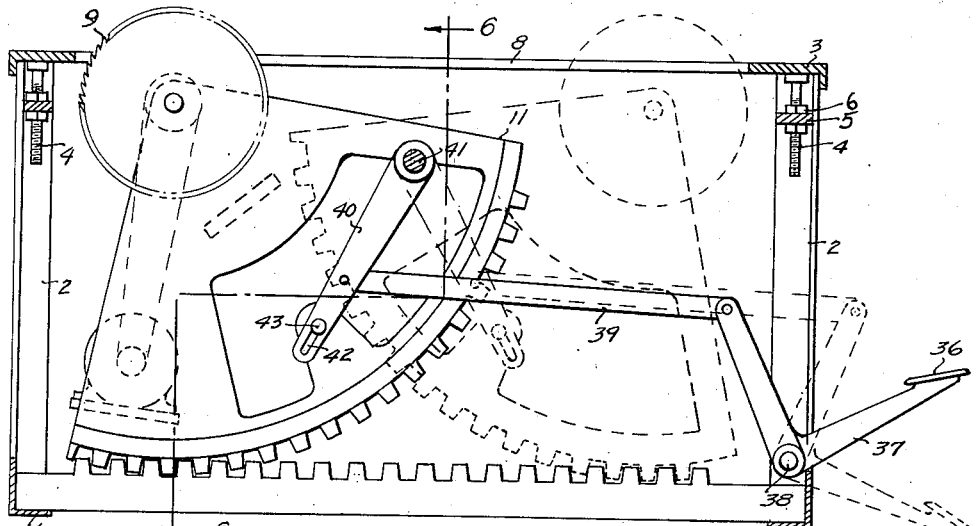
Figure 5 is a side elevation, partly in section, of an embodiment of the invention, showing an adaptation of treadle means for rocking the tool carrying frame.

As illustrated in the drawings, the mechanism comprises a horizontal base 1 and uprights 2 which support a table top 3 upon which is laid material to be worked. The table top 3 may be supported upon cross frame members 5, through which are received the depending ends of spindles 4 secured to the underside of the table. A nut 6 threadedly engages each spindle and transfers the weight of the table to the frame member, a lock nut being provided for an obvious purpose. The table top 3 is equipped with a slot 8 to accommodate the working run of a rotary tool 9, such as a circular saw.

Mounted longitudinally of the machine upon the base 2 are spaced parallel tracks 10, and rockably supported upon these tracks 10 is a tool carrying frame 11. The tool carrying frame 11 comprises side members 12, each of which is provided at the lower edge with an arcuate rocker surface for cooperatively bearing upon the corresponding track and which side members may, for example, be made in the form of a sector of a circle. In the several illustrated embodiments of the invention the ends of each side member 12, corresponding to the radii of the sector, are disposed at an angle to each other of 60° or more, depending upon the length of travel to be imparted to the tool. It will readily be understood that the longer the length of the radii of the rocker surfaces the shorter need be the arc thereof to provide the same length of saw travel. Each of the side members 12 is equipped with sprocket teeth 13 upon its arcuate rim which mesh with sprocket teeth upon at least one of the tracks 10. A shaft or arbor 14, upon which is mounted the rotary tool or saw 9, is suitably journaled in the frame 11 coaxially with the arc of the rocker surfaces. Thus it will be seen that when the tool carrying frame 11 is rocked upon the tracks 10 the tool 9 will be caused to travel through a predetermined pathway in a horizontal straight line.

Power to drive the tool 9 is transmitted to the arbor by means of a belt 15 trained around a pulley 16 mounted on the arbor, and around a pulley 17 secured to the armature shaft of an electric motor 18 mounted on a base 19 fixed between the sides 12 of the frame 11 at what may be termed the rear edge of the sector.

Figure 8:
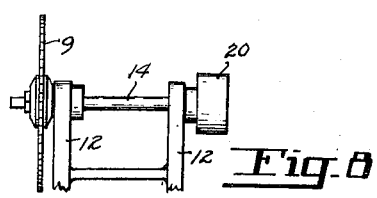
Figure 8 is a fragmentary detail of the arbor, showing a modification of the power take-off for operating the tool.

It will be noted that the motor is mounted at a point adjacent the arcuate rim of the frame and near the rear end of the rockers, in which position it resists by force of gravity the movement of the frame 11 away from the position illustrated in full lines in Figure 1, the resisting force increasing with the length of travel of the tool. By mounting the motor upon the frame 11 in the position just described, it serves as a weight for resisting forward movement of the frame, and for restoring the frame 11 to a starting position each time after the tool has completed a certain operation. It will be appreciated, of course, that in place of the motor 18, any suitable weight may be mounted on the base 19 between the sides 12 of the tool carrying frame 11, power to drive the tool being transmitted from another source (not shown) to a pulley 20 mounted on the arbor 14 in the manner illustrated in Figure 8. The operation of a weight mounted at the rear end of the rockers (whether or not the weight be supplied by the presence of the motor 18) is to tend normally to maintain the tool 9 and the tool carrying frame 11 in a rearward position. The gist of the invention, however, is the provision of a rockable tool carrying frame which operates to move the tool in a straight line at a predetermined elevation, and it is not deemed to be essential that the tool carrying frame be restored to a starting position each time after the completion of a certain operation by means of a weight positioned in line with one leg of the frame. It is intended to be within the purview of the present invention that the tool carrying frame may be rocked by any suitable mechanism made for that purpose.

In Figure 3 is shown a fragmentary detail of a track 10 comprising a timber 22 having a multiplicity of short pins 23 projecting horizontally from one side thereof which form a track over which the tool carrying frame 11 is rocked, the rim thereof being designed to engage with the pins 23 and hold the frame from retrograding movement during a cutting operation. The upper surface of each timber 22 is rounded, and the pins 23, projecting inwardly toward the timber forming the other rail of the track, are preferably elevated somewhat above the floor. This construction provides a track which is easily kept free of accumulations of sawdust and the like, and insures accurate, smooth action of the tool carrying frame. The rim of each side member 12 is provided with a flange 21, the flanges being provided with spaced notches 24 for engaging said pins 23 as the frame is rocked. The notched flanges are similar to a sector gear, and the pins 23 form a rack, this construction preventing creeping of the tool carrying frame, and holding the tool in proper alignment.

Figure 9:
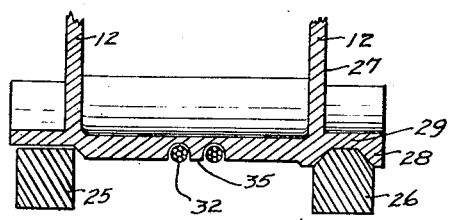
Figure 9 is a fragmentary sectional elevation of the track for the saw carrying frame, taken on the line 9—9 of Figure 4.

A modification of the track structure for the tool carrying frame is illustrated in Figures 4 and 9. The structure there shown is particularly desirable when the invention is to be embodied in a cut-off saw for severing heavy timbers, as in a sawmill. The construction illustrated comprises spaced apart parallel timbers 25 and 26 which form a track for the saw carrying frame 27. At least one of the timbers, 26, is so shaped that its upper surface, in cross section, is in the form of an inverted, truncated V. The corresponding arcuate rim portion 28 of the saw carrying frame 27 includes a flange 29, the under side of which is recessed so as to provide running engagement with the upper surface of the timber 26. In this connection, attention is directed to the construction illustrated in Figure 6 in which one of the tracks 10 is shown as having a track portion 30 in the same form as that shown in Figure 9, the corresponding side member 12 of the saw carrying frame 11 including a flange 31 so shaped as to have running engagement with the track 30.

For holding the saw carrying frame 27 (Figures 4 and 9) within predetermined bounds and for preventing creeping thereof during a sawing operation, the end of a cable 32 is affixed to each end of the saw carrying frame, the cable underlying the frame 27 and being attached to one of the frame members at the opposite end of the machine by means of an eye bolt 33 passing therethrough. Tension on the cable 32 may be adjusted in the well known manner by means of a nut 34 threaded onto the projecting end of the eye bolt. In the illustrated embodiment of the invention the cables 32 lie in closely spaced parallel relation, their working runs being received in suitable recesses in a guide block 35 disposed centrally of the rim of the saw carrying frame 27.

Figures 1 and 2 illustrate a simple application of the present invention. Mounted upon the arbor 14 of the frame 11 is a circular saw 9, the device being particularly useful as a small shop saw or one capable of being moved from place to place in connection with construction work. Extending transversely of the saw carrying frame 11 and interconnecting the side members 12—12 is a cross frame member 45 positioned adjacent the lower extremity of the front leg of the frame. The cross frame member 45 is so positioned as to be used as a treadle for rocking the frame, and an operator may make use of the device by the simple expedient of pressing upon the cross frame member 45 with his foot.

The motor being energized to drive the saw, sufficient pressure is exerted upon the cross frame member 45 to overcome the force of gravity exerted by the motor 18 and cause the frame 11 to be rolled forwardly upon the tracks 10. Thus the saw 9 is moved forward in a horizontal straight line to do the work required of it. Upon completing the sawing operation, the operator removes his foot from the cross frame member 45, whereupon the weight of the motor 18 causes the frame to roll backward and resume its normal or rest position, from which position it may again be rocked forwardly to commence another sawing operation.

Figure 6:
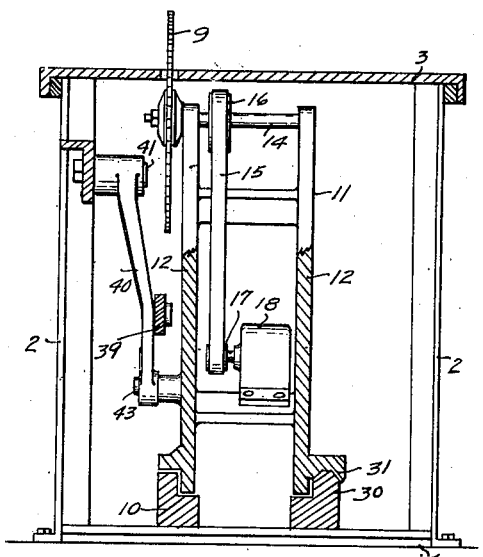
Figure 6 is a sectional elevation taken transversely of the machine on the line 6—6 of Figure 5.
Figure 7:
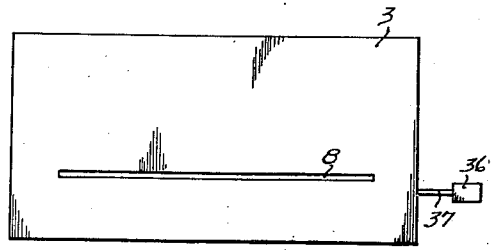
Figure 7 is a plan view of the apparatus illustrated in Figure 6.

Referring now to Figures 5 and 6, the saw carrying frame 11 is rocked upon the tracks 10 through the action of a treadle 36 affixed to the forward or free end of a bell crank 37 pivoted at 38 and connected by means of a link 39 to an arm 40. One end of the arm 40 is pivotally mounted on a stud shaft 41 fixed to the frame of the machine, the other end being deflected as shown in Figure 6 to cause it to lie in parallel juxtaposition to the adjacent side member 12 of the saw carrying frame, to which it is loosely pivoted as by a longitudinally disposed slot 42 and a through bolt 43 threaded into an aperture provided therefor in the saw carrying frame 11. Preferably, the stud shaft 41, which is the pivotal point for the arm 40, extends at right angles from a point substantially midway between the limits of travel of the saw, the deflected end of the arm 40 being pivoted to the saw carrying frame 11 at a point along the center radius of the frame, by reason of which construction the frame 11 may be rocked from the rest position illustrated in full lines in Figure 5 to the end of the full stroke of the saw illustrated in dotted lines in Figure 5 with the least possible expenditure of effort. By this means the maximum leverage to be exerted by the treadle 36 is provided for under all working conditions.

In operation, the motor 18 being energized to drive the saw 9, the operator standing in front of the machine feeds the material to be sawed upon the table top 3 and presses the treadle 36 with his foot. The effect is to rock the saw carrying frame 11 forwardly from its rest position to cause the saw 9 to advance from its position shown in full lines in Figure 5 toward the position therein shown in dotted lines. As the treadle 36 is depressed and the frame 11 rocked forwardly on the tracks 10, the weight of the motor 18 is lifted against the force of gravity, the resistance offered thereby increasing with the length of travel of the saw. At the completion of any certain sawing operation, the movement of the saw carrying frame is suddenly and forcibly reversed, and the frame restored to its normal rearward position, merely by releasing the foot treadle 36.

Among the advantages of the constructions hereinabove described is the fact that the machine provides the widest possible margin of safety. In case the saw pinches in the cut the saw will jump away from the operator, and, since the material is placed directly against the guide (not shown), the stock cannot be thrown at the operator. Moreover, the machine lends itself very readily to guards, and to devices for removing sawdust. A further advantage of the invention is that a machine employing its use is extremely mobile. By removing the table top 3 the machine can be disassembled into three parts merely by lifting them apart, so that one man can easily move a very powerful rig.

It is intended that it shall be understood that although the particular embodiment of the invention herein illustrated and described is primarily designed as a shop saw, with the tracks and table top constituting component parts of one machine, the device is also applicable for use as a cut-off saw in a sawmill. Moreover, it is not intended that the application of the device shall be limited to the use of any particular type or kind of tool, or for operation on any particular kind of material, the invention being susceptible for use wherever it is needful to move a tool in a horizontal straight line. It is intended that the invention may be used either in its entirety or in part, and either with or without modifications, without departing from the spirit of the invention, and I deem myself entitled to all such uses and modifications and/or variations as fall within the spirit and scope of the claims hereto appended.

Having now described my invention and in what manner the same may be used, what I claim as new and desire to protect by Letters Patent is:

1. A power tool comprising a support, spaced parallel tracks on said support, a frame having a pair of arcuate bearing surfaces mounted on said tracks for limited rocking movement thereupon, a tool arbor mounted on said frame coaxially with the axis of the arc of said bearing surfaces whereby rocking movement of said frame will exert a straight line motion to said arbor, a motor for driving said arbor, said motor being mounted on said frame toward one end of said bearing surfaces whereby the weight of said motor rocks said frame to a predetermined position, and means for rocking said frame away from said predetermined position to move said tool arbor into operative engagement with a workpiece.

2. A power tool comprising a support, a pair of spaced apart parallel tracks extending longitudinally on said support, a frame having means defining a pair of arcuate rockers, said rockers being arranged upon said tracks for limited rocking movement thereupon, an arbor mounted on said frame coaxially with the axis of the arc of said rockers, said frame being wholly supported and guided by said tracks, said arbor being guided in a predetermined straight line solely by engagement of said rockers with said tracks upon rocking movement of said frame, manually operable means for rocking said frame in one direction, and a counterweight mounted on said frame for rocking said frame in the opposite direction.

3. A power tool comprising a support, a pair of spaced apart longitudinal tracks arranged parallel to each other on said support, a frame having a pair of opposite side members defining a pair of arcuate rockers arranged upon said tracks for limited rocking movement thereupon, means for preventing slipping of said frame relative to said tracks, an arbor journaled upon said side frame members coaxially with the axis of the arc of said rockers, a saw mounted on said arbor, a transverse frame member rigidly securing together said side frame members, a motor supported on said transverse member toward one end of said rockers for rocking said frame in one direction upon said tracks, means for rocking said frame in the opposite direction, said frame being wholly supported and guided by said tracks whereby said saw is guided in a predetermined straight line movement upon rocking of said frame.

4. A power tool comprising a support, a pair of spaced apart longitudinal tracks arranged parallel to each other on said support, a frame having a pair of opposite side members defining a pair of arcuate rockers arranged upon said tracks for limited rocking movement thereupon, means for preventing slipping of said frame relative to said tracks, an arbor journaled upon said side frame members coaxially with the axis of the arc of said rockers and extending between said side members, a saw mounted on said arbor and between said side members, a transverse frame member rigidly securing together said side frame members, a motor supported on said transverse member toward one end of said rockers for rocking said frame in one direction upon said tracks, means for rocking said frame in the opposite direction, said frame being wholly supported and guided by said tracks whereby said saw is guided in a predetermined straight line movement upon rocking of said frame.

5. A power tool comprising a support, a pair of longitudinally spaced apart tracks mounted in a parallel relation on said support, a frame having a pair of arcuate rockers mounted upon said tracks for limited rocking movement thereupon, means for preventing slipping of said frame relative to said tracks, a tool arbor mounted on said frame coaxially with the axis of the arc of said rockers, said frame including members joining said rockers rigidly together, means on said rockers for guiding rocking movement thereof along a predetermined line upon said tracks, motor means mounted on said frame members and operatively connected to said arbor, said motor means rocking said frame to one limit position, and means for rocking said frame to a second limit position, said tool arbor being guided along a predetermined straight line solely by engagement of said rockers on said tracks.

OMER MOORE.